(12) United States Patent
Chun et al.

(10) Patent No.: US 8,825,485 B2
(45) Date of Patent: Sep. 2, 2014

(54) TEXT TO SPEECH METHOD AND SYSTEM CONVERTING ACOUSTIC UNITS TO SPEECH VECTORS USING LANGUAGE DEPENDENT WEIGHTS FOR A SELECTED LANGUAGE

(75) Inventors: Byung Ha Chun, Cambridge (GB); Sacha Krstulovic, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 327 days.

(21) Appl. No.: 13/377,706

(22) PCT Filed: Jun. 10, 2009

(86) PCT No.: PCT/GB2009/001464
§ 371 (c)(1),
(2), (4) Date: Feb. 29, 2012

(87) PCT Pub. No.: WO2010/142928
PCT Pub. Date: Dec. 16, 2010

(65) Prior Publication Data
US 2012/0278081 A1    Nov. 1, 2012

(51) Int. Cl.
*G10L 13/00* (2006.01)
*G10L 13/08* (2013.01)

(52) U.S. Cl.
USPC .......................... 704/260; 704/258; 704/266

(58) Field of Classification Search
CPC ............................ G10L 13/00; G10L 2013/00
USPC .................................................. 704/258, 260
See application file for complete search history.

(56) References Cited

U.S. PATENT DOCUMENTS 5,970,453 A * 10/1999 Sharman ...................... 704/260

8,244,534 B2 * 8/2012 Qian et al. ................. 704/256.3
8,583,418 B2 * 11/2013 Silverman et al. ................ 704/9
2009/0055162 A1 2/2009 Qian et al.

FOREIGN PATENT DOCUMENTS

JP          2004-287444 A    10/2004
WO     WO 2009/026270 A2     2/2009
WO     WO 2009/026270 A3     2/2009

OTHER PUBLICATIONS

Examination Report under Section 18(3) issued Nov. 8, 2012 in United Kingdom Patent Application No. GB1200335.6.
Heiga Zen et al., "Statistical Parametric Speech Synthesis", Speech Communication, Elsevier Science Publishers, vol. 51, No. 11, XP026349492, pp. 1039-1064, Jan. 14, 2009.
Office Action issued Feb. 12, 2013, in Japanese Patent Application No. 2012-514523 with English translation.

(Continued)

*Primary Examiner* — Shaun Roberts
(74) *Attorney, Agent, or Firm* — Oblon, Spivak, McClelland, Maier & Neustadt, L.L.P.

(57) ABSTRACT

A text-to-speech method for use in a plurality of languages, including: inputting text in a selected language; dividing the inputted text into a sequence of acoustic units; converting the sequence of acoustic units to a sequence of speech vectors using an acoustic model, wherein the model has a plurality of model parameters describing probability distributions which relate an acoustic unit to a speech vector; and outputting the sequence of speech vectors as audio in the selected language. A parameter of a predetermined type of each probability distribution in the selected language is expressed as a weighted sum of language independent parameters of the same type. The weighting used is language dependent, such that converting the sequence of acoustic units to a sequence of speech vectors includes retrieving the language dependent weights for the selected language.

18 Claims, 8 Drawing Sheets

(56) References Cited

OTHER PUBLICATIONS

Office Action issued Jul. 9, 2013 in Japanese Patent Application No. 2012-514523 (with English language translation).

International Search Report and Written Opinion issued Mar. 12, 2009 in PCT/GB2009/001464.

Javier Latorre et al., "New Approach to the Polyglot Speech Generation by Means of an HMM-based Speaker Adaptable Synthesizer", Speech Communication, Elsevier Science Publishers, vol. 48, No. 10, XP025056845, Oct. 1, 2006, pp. 1227-1242.

Alan W. Black et al., "Speaker Clustering for Multilingual Synthesis", Multiling-2006, XP002556503, Apr. 9-11, 2006, pp. 1-5.

Heiga Zen et al., "Statistical Parametric Speech Synthesis", Speech Communication, Elsevier Science Publishers, vol. 51, No. 11, XP026349492, pp. 1039-1064.

* cited by examiner

TEXT TO SPEECH METHOD AND SYSTEM CONVERTING ACOUSTIC UNITS TO SPEECH VECTORS USING LANGUAGE DEPENDENT WEIGHTS FOR A SELECTED LANGUAGE

The present invention relates to text to speech systems where audio speech or audio speech files are outputted in response to reception of a text file. More specifically, the present invention is concerned with a polyglot text to speech system where speech or audio speech files may be outputted in a plurality of different languages.

The text to speech systems are used in a large variety of applications such as speech-to-speech translation systems, satellite navigation, automated telephone directory systems etc.

There are considerable difficulties with training such a polyglot system in that the amount of training data required for every language is considerably large. Further, the amount of processing power required for such a system is considerably large.

Recently, a statistical parametric polyglot synthesis technique has been proposed by J. Latorre, K. Iwano and S. Furui "New approach to the polyglot speech generation by means of an HMM speech based adaptable synthesiser" Speech Communication vol. 48, no. 10, pp 1227 to 1242, 2006. This system assumes that the average voice created by combining speech data from a sufficient number of speakers is the same for any language. This is justified since the most important factors which defines voice characteristics of a speaker the dimensions of the speaker's vocal tract. On average, the dimensions of the vocal track are pretty much the same for the speakers of any language. Therefore, it can assumed that when a sufficient number of speakers are considered, their average voice has to be more or less the same for any language. According to this hypothesis, it should be possible to create an artificial polyglot speaker either by combing the average voices of all languages as a consideration of a mixing speech data of multiple speakers of those languages into a single polyglot average voice.

The above system uses Hidden Markov Model text-to-speech synthesis

In single language systems, training is achieved using data from multiple speakers using so called speaker adaptive training which is explained for example in M. J. F. Gales, "Maximum likelihood linear transformations for HMM-based speech recognition" in Computer Speech and Language, vol. 12, no. 2, pp. 75-98, 1998.

The present invention sets out to address the above problems and provides a system with a structure such that the training can be performed by considering all of the data together.

Therefore, in the first aspect, the present invention provides a method of training a text to speech system, said text-to-speech system comprising an acoustic model used to convert a sequence of acoustic units to a sequence of speech vectors, said model having a plurality of model parameters comprising language and speaker independent parameters, language dependent parameters and speaker dependent parameters describing probability distributions relating acoustic units to speech vectors, the method comprising:

expressing the auxiliary function of an Expectation Maximisation algorithm in terms of language and speaker independent parameters, language dependent parameters and speaker dependent parameters, said auxiliary function involving summations of data from different languages and different speakers;

receiving a plurality of inputs of audio speech each of which correspond to known text from a speaker in a known language, wherein at least two inputs have different languages;

deriving an initial estimate of the language and speaker independent parameters, the language dependent parameters and the speaker dependent parameters;

maximising said auxiliary function with respect to language and speaker independent parameters, language dependent parameters and speaker dependent parameters to obtain a better estimate of said language and speaker independent parameters, the language dependent parameters and the speaker dependent parameters;

repeating said maximisation step until said language and speaker independent parameters, the language dependent parameters and the speaker dependent parameters converge.

In an embodiment, one group of parameters comprises said language and speaker independent parameters, one group of parameters comprises said language dependent variables and one group of parameters comprises said speaker dependent variables, wherein maximising said auxiliary function comprises maximising said function with respect to each group of parameters in an iterative manner.

The predetermined type of parameter in each probability distribution for a language may be expressed as a weighted sum of language independent parameters of the same type and said language dependent parameters are said weightings which are language dependent. In a preferred embodiment, said predetermined type of parameter is the mean of a probability distribution.

In a preferred embodiment, said means are clustered and a language dependent weighting is applied for each cluster for each language. More preferably, each cluster is a decision tree, the decisions represented by said trees being related to linguistic, phonetic or prosodic variations.

The construction of the decision tree is preferably performed after cycle of maximising said language and speaker independent parameters, language dependent parameters and speaker dependent parameters.

The speaker and language independent parameters will also generally comprise variances of said probability distributions, wherein said variances are preferably clustered and a decision tree is formed for each cluster.

Said speaker dependent parameters preferably comprise transform parameters applied to a speech vector or speaker independent model parameters.

In a second aspect, the present invention provides a method of adapting a polyglot text-to-speech system to operate in a new language, said polyglot text-to-speech system comprising: an acoustic model used to convert a sequence of acoustic units to a sequence of speech vectors, said model having a plurality of model parameters comprising language and speaker independent parameters describing probability distributions relating acoustic units to a speech vectors, language dependent parameters and speaker independent parameters and speaker dependent parameters, said method comprising:

expressing the auxiliary function of an Expectation Maximisation algorithm in terms of language and speaker independent parameters, language dependent parameters and speaker dependent parameters, said auxiliary function involving summations of data from different languages and different speakers;

receiving a plurality of inputs of audio speech each of which correspond to known text from at least two speakers in said new language;

obtaining an initial estimate of the speaker dependent parameters use for the speakers of the new language;

obtaining an initial estimate of the language dependent parameters for said new language;

maximising said auxiliary function with respect to language dependent parameters and speaker dependent parameters to obtain a better estimate of said language dependent parameters and speaker dependent parameters for all speakers and languages;

repeating said maximisation step until said language dependent parameters and the speaker dependent parameters converge.

The above adaptation method allows the system to incorporate a new language with little training data on that language.

In a third aspect, the present invention provides a text-to-speech method for use in a plurality of languages, said method comprising:

inputting text in a selected language;

dividing said inputted text into a sequence of acoustic units;

converting said sequence of acoustic units to a sequence of speech vectors using an acoustic model, wherein said model has a plurality of model parameters describing probability distributions which relate an acoustic unit to a speech vector; and outputting said sequence of speech vectors as audio in said selected language, wherein a parameter of a predetermined type of each probability distribution in said selected language is expressed as a weighted sum of language independent parameters of the same type, and wherein the weighting used is language dependent, such that converting said sequence of acoustic units to a sequence of speech vectors comprises retrieving the language dependent weights for said selected language.

The above method may further comprise selecting a voice for the audio output, obtaining transform parameters for said voice and transforming the speech vectors for the selected language to the selected voice using said transform parameters.

In a preferred embodiment, the parameter of a predetermined type is a mean.

The probability distributions may be selected from a Gaussian distribution, Poisson distribution, Gamma distribution, Student-t distribution or Laplacian distribution.

The acoustic units may be phonemes, graphemes, context dependent phonemes or graphemes, diphones, triphones or syllables.

The acoustic model may, for example be a hidden Markov model or a hidden semi-Markov model.

In a fourth aspect, the present invention provides a text-to-speech processing system for use in a plurality of languages, said system comprising:

a text input configured to accept inputted text;

a processor configured to:

divide said inputted text into a sequence of acoustic units; convert said sequence of acoustic units to a sequence of speech vectors using an acoustic model, wherein said model has a plurality of model parameters describing probability distributions which relate an acoustic unit to a speech vector; and output said sequence of speech vectors as audio in said selected language, wherein a parameter of a predetermined type of each probability distribution in said selected language is expressed as a weighted sum of language independent parameters of the same type, and wherein the weighting used is language dependent, such that converting said sequence of acoustic units to a sequence of speech vectors comprises retrieving the language dependent weights for said selected language.

In a fifth aspect, the present invention provides a trainable text-to-speech system, the system comprising a processor configured to run an acoustic model which converts a sequence of acoustic units to a sequence of speech vectors, said model having a plurality of model parameters comprising language and speaker independent parameters, language dependent parameters and speaker dependent parameters describing probability distributions relating acoustic units to speech vectors, the processor being configured to:

express the auxiliary function of an Expectation Maximisation algorithm in terms of language and speaker independent parameters, language dependent parameters and speaker dependent parameters, said auxiliary function involving summations of data from different languages and different speakers;

receive a plurality of inputs of audio speech each of which correspond to known text from a speaker in a known language, wherein at least two inputs have different languages;

derive an initial estimate of the language and speaker independent parameters, the language dependent parameters and the speaker dependent parameters;

maximise said auxiliary function with respect to language and speaker independent parameters, language dependent parameters and speaker dependent parameters to obtain a better estimate of said language and speaker independent parameters, the language dependent parameters and the speaker dependent parameters; and repeat said maximisation until said language and speaker independent parameters, the language dependent parameters and the speaker dependent parameters converge.

In a sixth aspect, the present invention provides a polyglot text-to-speech system which is adaptable to a new language, said polyglot text-to-speech system comprising a processor configured to run an acoustic model used to convert a sequence of acoustic units to a sequence of speech vectors, said model having a plurality of model parameters comprising language and speaker independent parameters describing probability distributions relating acoustic units to a speech vectors, language dependent parameters and speaker independent parameters and speaker dependent parameters, said processor being further configured to:

express the auxiliary function of an Expectation Maximisation algorithm in terms of language and speaker independent parameters, language dependent parameters and speaker dependent parameters, said auxiliary function involving summations of data from different languages and different speakers;

receive a plurality of inputs of audio speech each of which correspond to known text from at least two speakers in said new language;

obtain an initial estimate of the speaker dependent parameters use for the speakers of the new language;

obtain an initial estimate of the language dependent parameters for said new language;

maximise said auxiliary function with respect to language dependent parameters and speaker dependent parameters to obtain a better estimate of said language dependent parameters and speaker dependent parameters for all speakers and languages;

and repeat said maximisation step until said language dependent parameters and the speaker dependent parameters converge.

The present invention can be implemented either in hardware or on software in a general purpose computer. Further the present invention can be implemented in a combination of hardware and software. The present invention can also be implemented by a single processing apparatus or a distributed network of processing apparatuses.

Since the present invention can be implemented by software, the present invention encompasses computer code provided to a general purpose computer on any suitable carrier medium. The carrier medium can comprise any storage medium such as a floppy disk, a CD ROM, a magnetic device or a programmable memory device, or any transient medium such as any signal an electrical, optical or microwave signal.

The present invention will now be described with reference to the following non-limiting embodiments, in which.

Figure 1:
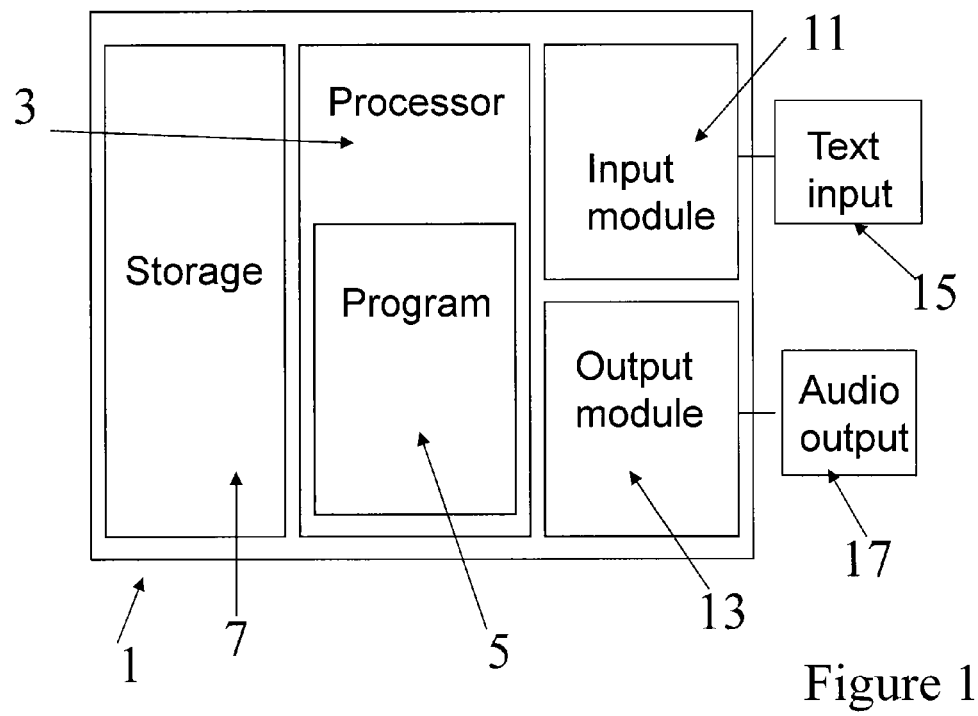
FIG. 1 is schematic of a text to speech system.

FIG. 1 shows a text to speech system 1. The text to speech system 1 comprises a processor 3 which executes a program 5. Text to speech system 1 further comprises storage 7. The storage 7 stores data which is used by program 5 to convert text to speech. The text to speech system 1 further comprises an input module 11 and an output module 13. The input module 11 is connected to a text input 15. Text input 15 receives text. The text input 15 may be for example a keyboard. Alternatively, text input 132 may be a means for receiving text data from an external storage medium or a network.

Connected to the output module 13 is output for audio 17. The audio output 17 is used for outputting a speech signal converted from text input into text input 13. The audio output 17 may be for example a direct audio output e.g. a speaker or an output for an audio data file which may be sent to a storage medium, networked etc.

In use, the text to speech system 1 receives text through text input 13. The program 5 executed on processor 3 converts the text into speech data using data stored in the storage 7. The speech is output via the output module 15 to audio output 17.

Figure 2:
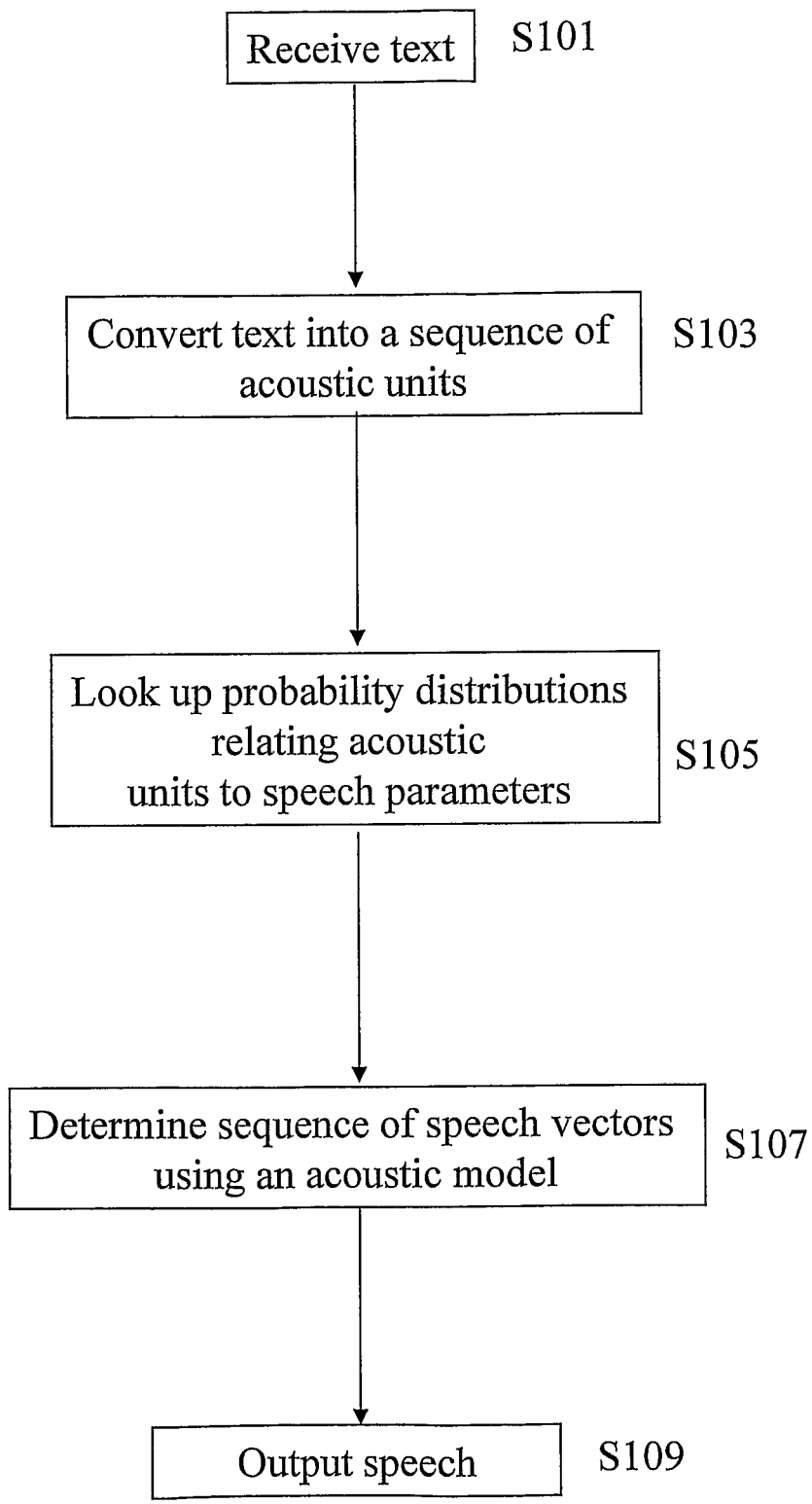
FIG. 2 is a flow diagram showing the steps performed by a known speech processing system.

A simplified process will now be described with reference to FIG. 2. In first step, S101, text is inputted. The text may be inputted via a keyboard, touch screen, text predictor or the like. The text is then converted into a sequence of acoustic units. These acoustic units may be phonemes or graphemes. The units may be context dependent e.g. triphones which take into account not only the phoneme which has been selected but the proceeding and following phonemes. The text is converted into the sequence of acoustic units using techniques which are well-known in the art and will not be explained further here.

Instead S105, the probability distributions are looked up which relate acoustic units to speech parameters. In this embodiment, the probability distributions will be Gaussian distributions which are defined by means and variances. Although it is possible to use other distributions such as the Poisson, Student-t, Laplacian or Gamma distributions some of which are defined by variables other than the mean and variance.

It is impossible for each acoustic unit to have a definitive one-to-one correspondence to a speech vector or "observation" to use the terminology of the art. Many acoustic units are pronounced in a similar manner, are affected by surrounding acoustic units, their location in a word or sentence, or are pronounced differently by different speakers. Thus, each acoustic unit only has a probability of being related to a speech vector and text-to-speech systems calculate many probabilities and chose the most likely sequence of observations given a sequence of acoustic units.

Figure 3:
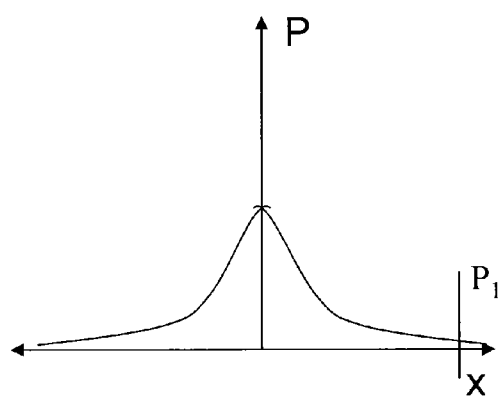
FIG. 3 is a schematic of a Gaussian probability function.

A Gaussian distribution is shown in FIG. 3 FIG. 3 can be thought of as being the probability distribution of an acoustic unit relating to a speech vector. For example, the speech vector shown as X has a probability P1 of corresponding to the phoneme or other acoustic unit which has the distribution shown in FIG. 3.

The shape and position of the Gaussian is defined by its mean and variance. These parameters are determined during the training of the system.

These parameters are then used in the acoustic model in step S107. In this description, the acoustic model is a Hidden Markov Model (HMM). However, other models could also be used.

The text of the speech system will store many probability density functions relating an to acoustic unit i.e. phoneme, grapheme, word or part thereof to speech parameters.

As the Gaussian distribution is generally used, these are generally referred to as Gaussians or components.

In a Hidden Markov Model or other type of acoustic model, the probability of all potential speech vectors relating to a specific acoustic unit must be considered then the sequence of speech vectors which most likely corresponds to the sequence of acoustic units will be taken into account. It is possible that the most likely speech vector for a specific acoustic unit will not be the best speech vector when a sequence of acoustic units is considered.

Once a sequence of speech vectors have been determined, speech is output in step S109.

Figure 4:
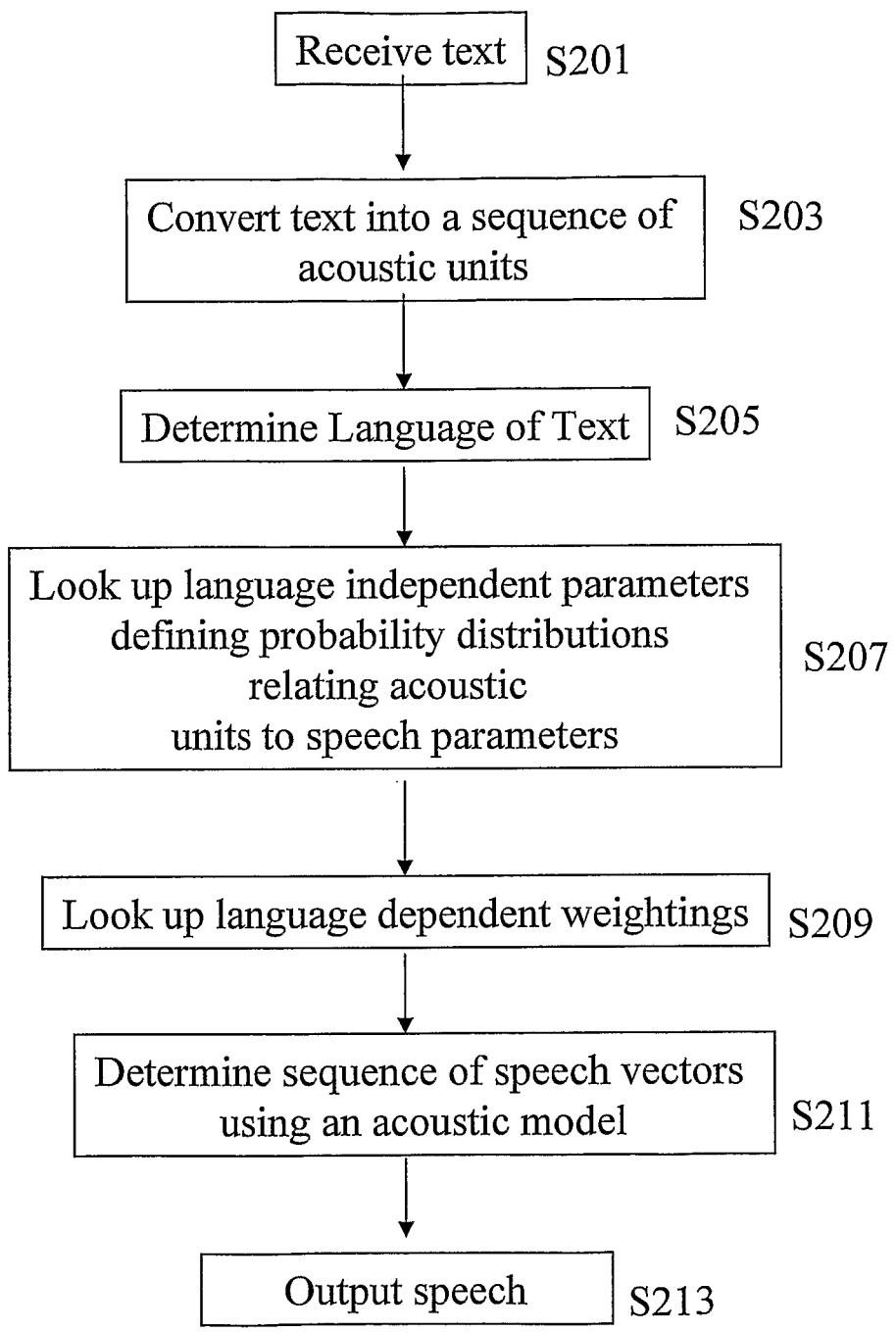
FIG. 4 is a flow diagram of a speech processing method in accordance with an embodiment of the present invention.

FIG. 4 is a flowchart of a process for a text to speech system in accordance with an embodiment of the present invention. In step S201, text is received in the same manner as described with reference to FIG. 2. The text is then converted into a sequence of acoustic units which may be phonemes, graphemes, context dependent phonemes or graphemes and words or part thereof in step S203.

The system of FIG. 4 is a so-called polyglot text to speech system which can output speech in a number of different languages. In step S205, the language of the text is determined. This may be done by the user providing an input concerning the language or the text, data stored during set-up of the system concerning the preferred language of use or there may be some sort of automatic method for determining the language.

In the method which is described with reference to FIG. 4, the Gaussian for each component is described by a mean and a variance. In the system of FIG. 4, the mean of a Gaussian in a selected language is expressed as a weighted sum of language independent means. Thus:

$$\mu_m^l = \sum_i \lambda_i^l \mu_m$$

where $\mu_m^l$ is the mean of component m in selected language l, $\lambda_i^l$ the language dependent weighting for mean l and $\mu_m$ is the language independent mean for component m.

In step S207, the system looks up the language independent means and variances which will be stored in an accessible manner.

In step S209, the system looks up the language dependent weightings for the means. It will be appreciated by those skilled in the art that the language dependent weightings may be looked up before or after the language independent parameters.

Thus, after step S209, it is possible to obtain language dependent means i.e. using the language independent means and applying the weightings, these are then used in an acoustic model in step S211 in the same way as described with reference to step S107 in FIG. 2. The speech is then output in step S213.

In a preferred embodiment, the language independent means are clustered and each cluster comprises a decision tree, the decisions used in said trees are based on linguistic, phonetic and prosodic variations. Prosodic, phonetic, and linguistic contexts affect the final speech waveform. Phonetic contexts typically affects vocal tract, and prosodic (e.g. syllable) and linguistic (e.g., part of speech of words) contexts affects prosody such as duration (rhythm) and fundamental frequency (tone).

In a preferred embodiment, the mean of a Gaussian distribution in a selected language is expressed as a weighted sum of language independent means, where the summation uses one mean from each cluster, the mean being selected on the basis of the prosodic, linguistic and phonetic context of the acoustic unit which is currently being processed.

Figure 5:
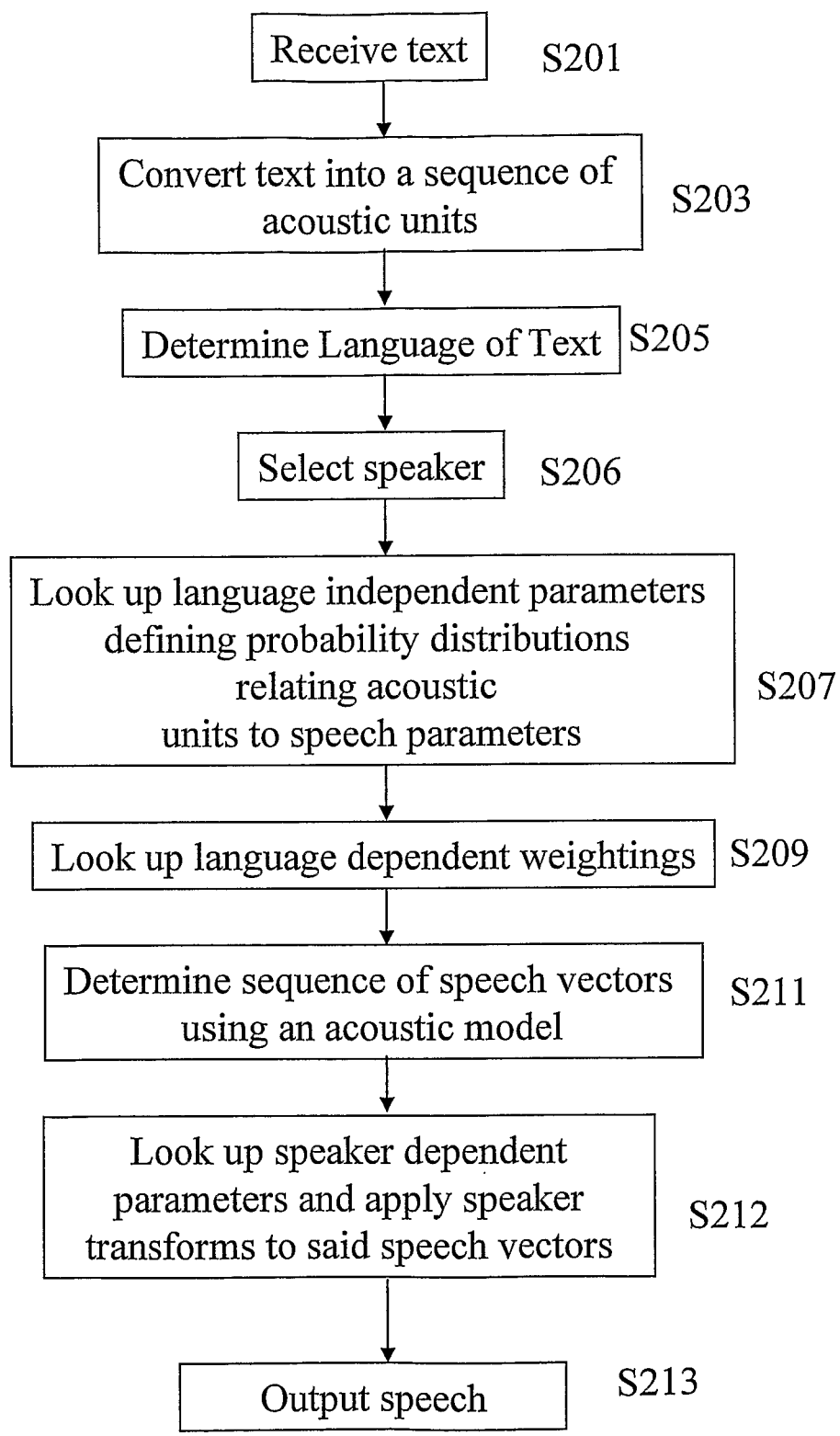
FIG. 5 is a flow diagram of a speech processing method in accordance with a further embodiment of the present invention.

In a further preferred embodiment, the method can also handle different speakers in addition to different languages. Such a method is shown in FIG. 5. To avoid unnecessary repetition, like reference numerals will be used to denote like features.

In FIG. 5, in step S206, the text to speech system selects a speaker. The speaker will be selected from a plurality of pre-stored speaker profiles. The selected speaker profile can be determined during the initial set up of the system and not every time the system is used. Selecting the speaker profile may also be performed after the speech vectors are determined in step S211.

When the system knows the desired speaker, the system can look up speaker dependent parameters in step S212. In this embodiment, the speaker dependent parameters are linear transforms which are applied to the speech vectors derived in step S211 such that:

$$\hat{o}_{r(m)}^{(s)}(t) = A_{r(m)}^{(s)} o(t) + b_{r(m)}^{(s)},$$

where $A_{r(m)}^{(s)}$ and $b_{r(m)}^{(s)}$ are the linear transformation matrix and the bias vector associated with regression class r(m) for the speaker s, o(t) is the output vector derived in step S211 and $\hat{o}_{r(m)}^{(s)}(t)$ is the transformed speech vector for regression class r(m) for the speaker s.

In FIG. 5, in step S214, the speaker dependent transform is then applied to the speech vectors determined in step S211 in order to transform them to a selected voice.

In the above description, the speaker dependent transforms are applied to the speech vectors. However, they could just as easily be applied to the model parameters.

Next, the training of a system in accordance with an embodiment of the present invention will be described with reference to FIG. 6.

Figure 6:
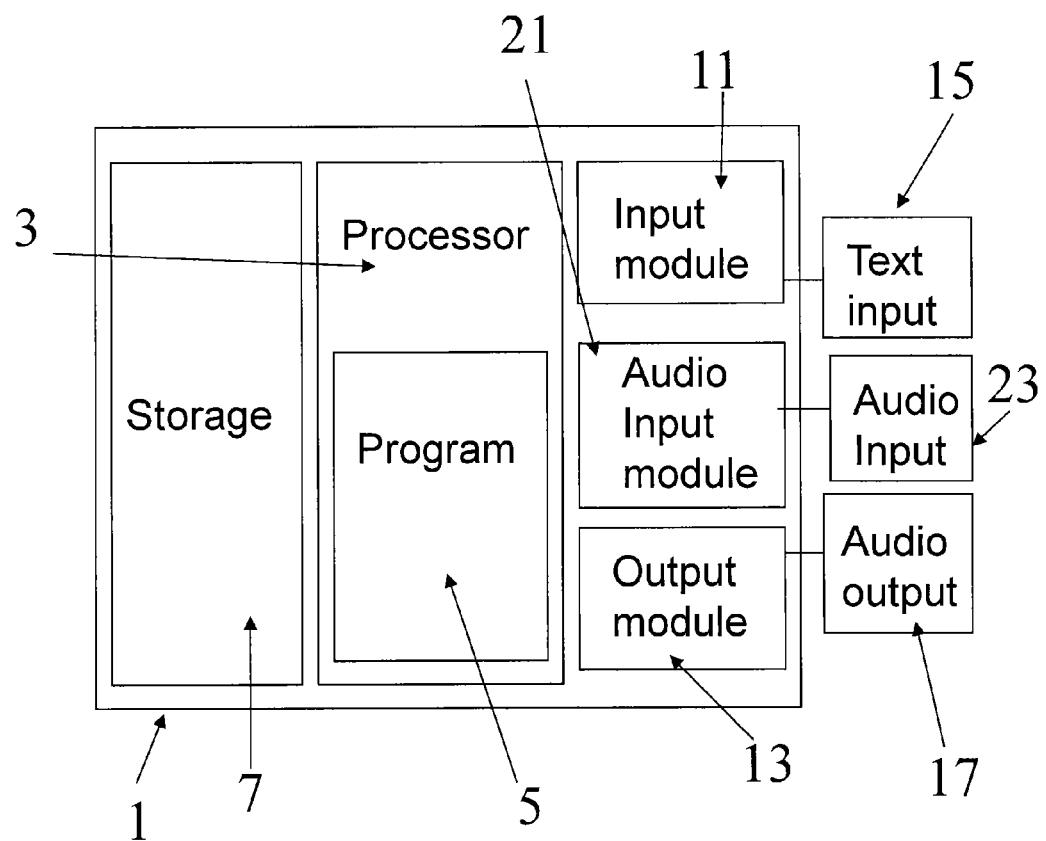
FIG. 6 is schematic of a text to speech system which can be trained.

The system of FIG. 6 is similar to that described with reference to FIG. 1. Therefore, to avoid any unnecessary repetition, like reference numerals will be used to denote like features.

In addition to the features described with reference to FIG. 1, FIG. 6 also comprises an audio input 23 and an audio input module 21. When training a system, it is necessary to have an audio input which matches the text being inputted via text input 15.

In speech processing systems which are based on Hidden Markov Models (HMMs), the HMM is often expressed as:

$$M=(A,B,\pi)$$

where $A=\{a_{ij}\}_{i,j=1}^N$ and is the state transition probability distribution, $B=\{b_j(o)\}_{j=1}^N$ is the state output probability distribution and $\pi=\{\pi_i\}_{i=1}^N$ is the initial state probability distribution and where N is the number of states in the HMM.

How a HMM is used in a text-to-speech system is well known in the art and will not be described here.

In the current embodiment, the state transition probability distribution A and the initial state probability distribution are determined in accordance with procedures well known in the art. Therefore, the remainder of this description will be concerned with the state output probability distribution.

Generally in text to speech systems for one speaker of one language, the state output vector or speech vector o(t) from an $m^{th}$ Gaussian component in a model set M is $$P(o(t)|m, M) = Gauss(o(t); \mu_m, \Sigma_m)$$

where $\mu_m$ is the mean of the $m^{th}$ Gaussian component and $\Sigma_m$ is the co-variance of the $m^{th}$ Gaussian component.

The aim when training a conventional text-to-speech system is to estimate the Model parameter set M which maximises likelihood for a given observation sequence. In the conventional model, the model parameter set is $\mu_m$ and $\Sigma_m$ for the all components m.

As it is not possible to obtain the above model set based on so called Maximum Likelihood (ML) criteria purely analytically, the problem is conventionally addressed by using an iterative approach known as the expectation maximisation (EM) algorithm which is often referred to as the Baum-Welch algorithm. Here, an auxiliary function (the "Q" function) is derived:

$$Q(M, M') = \sum_{m,t} \gamma_m(t) \log p(o(t), m | M)$$

where $\gamma_m(t)$ is the posterior probability of component m generating the observation o(t) given the current model parameters M' and M is the new parameter set. After each iteration, the parameter set M' is replaced by the new parameter set M which maximises Q(M, M'). p(o(t), m|M) is a generative model such as a GMM, HMM etc.

In the present embodiment a HMM is used which has a state output vector of:

$$P(o(t)|m, M) = \frac{1}{|A_{r(m)}^{(s)}|} N\left(o_{r(m)}^{(s)}(t); \mu_m^{(l)}, \sum_{v(m)}\right) \quad \text{Eqn. 1}$$

Where $m \in \{1, \ldots, M\}$, $t \in \{1, \ldots, T\}$, $s \in \{1, \ldots, S\}$ and $l \in \{1, \ldots, L\}$ are indices for component, time, speaker and language respectively and where M, T, S and L are the total number of components, frames, speakers and languages respectively.

For reasons which will be explained later, in this embodiment, the covariances are clustered and arranged into decision trees where $v(m) \in \{1, \ldots, V\}$ denotes the leaf node in a covariance decision tree to which the co-variance matrix of the component m belongs and V is the total number of variance decision tree leaf nodes.

R is the total number of regression classes and $r(m) \in \{1, \ldots, R\}$ denotes the regression class to which the component m belongs.

The speaker dependent feature transform gives:

$$\hat{o}_{r(m)}^{(s)}(t) = A_{r(m)}^{(s)} o(t) + b_{r(m)}^{(s)}, \quad \text{Eqn. 2}$$

where $A_{r(m)}^{(s)}$ and $b_{r(m)}^{(s)}$ are the linear transformation matrix and the bias vector associated with regression class r(m) for the speaker s.

As explained above in relation to the text to speech system, the means are expressed in a language independent form. This gives:

$$\mu_m^{(l)} = \sum_i \lambda_i^{(l)} \mu_{c(m,i)}, \quad \text{Eqn. 3}$$

In the above equation, language independent means are clustered together and an interpolation weight $\lambda$ is applied to each cluster. Therefore, $i \in \{1, \ldots, P\}$ is the index for a cluster, P is the total number of clusters, $\lambda_i^{(l)}$ is the interpolation weight of the $i^{th}$ cluster for language l. Each cluster comprises a decision tree. The details of the decision trees will be explained later. $c(m) \in \{1, \ldots, N\}$ indicates the leaf node in a mean decision tree to which the $i^{th}$ mean vector at the component m belongs and N is the total number of leaf nodes in all mean decision trees.

Using the above, the auxiliary function can be expressed as:

$$Q(M, M') = \quad \text{Eqn. 4}$$

$$-\frac{1}{2} \sum_{m,t,s,l} \gamma_m(t) \left\{ \log \sum_{v(m)} | - \log|A_{r(m)}^{(s)}|^2 + (\hat{o}_{r(m)}^{(s)}(t) - \mu_m^{(l)})^T \right.$$

$$\left. \sum_{v(m)}^{-1} (\hat{o}_{r(m)}^{(s)}(t) - \mu_m^{(l)}) \right\} + C$$

where C is a constant independent of M.

Thus, using the above and substituting equations 2 and 3 above, the auxiliary function shows that the model parameters may be split into three distinct parts. The first part are the parameters of the canonical model i.e. language independent means $\{\mu_n\}_n$ and the language independent covariance $\{\Sigma_k\}_k$. the above indices n and k indicate leaf nodes of the mean and variance decision trees which will be described later. The second part are the speaker dependent parameters. In this particular embodiment, the speaker dependent parameters are CMLLR constrained maximum likelihood linear regression. transforms $\{\{A_d^{(s)}, b_d^{(s)}\}_{s,d}\}$ where s indicates speaker and d indicates component or speaker regression class to which component m belongs. The third set of parameters are the language dependent parameters which in this embodiment are the language dependent weights $\{\lambda_i^{(l)}\}_{l,i}$ where l indicates language and i is the cluster index.

Once the auxiliary function is expressed in the above manner, it is then maximized with respect to each of the variables in turn in order to obtain the ML values of the speaker and language independent parameters, the speaker dependent parameters and the language dependent parameters.

In detail, for determining the ML estimate of the mean, the following procedure is performed:

First, the auxiliary function of equation 4 is differentiated with respect to $\mu_n$ as follows:

(5)

$$\frac{\partial Q(M, \hat{M})}{\partial \mu_n} = \quad \text{Eqn. 5}$$

$$\sum_{\substack{m,t,s,l,i \\ c(m,i)=n}} \gamma_m(t) \lambda_i^{(l)} \sum_{v(m)}^{-1} \hat{o}_{r(m)}^{(s)}(t) - \sum_{\substack{m,t,s,l,i \\ c(m,i)=n}} \gamma_m(t) \lambda_i^{(l)} \sum_{v(m)}^{-1} \lambda_i^{(l)} \mu_{c(m,i)} -$$

$$\sum_{\substack{m,t,s,l,i \\ c(m,i)=n}} \gamma_m(t) \lambda_i^{(l)} \sum_{v(m)}^{-1} \left\{ \sum_{\substack{j \neq i \\ c(m,i) \neq n}} \lambda_i^{(l)} \mu_{c(m,i)} \right\}.$$

By maximizing the equation in the normal way by setting the derivative to zero, the following formula is achieved for the ML estimate of $\mu_n$ i.e. $\hat{\mu}_n$:

$$\hat{\mu}_n = \left\{ \sum_{\substack{m,t,s,l,i \\ c(m,i)=n}} \gamma_m(t) \lambda_i^{(l)} \sum_{v(m)}^{-1} \lambda_i^{(l)} \right\}^{-1} \cdot \quad \text{Eqn. 6}$$

$$\sum_{\substack{m,t,s,l,i \\ c(m,i)=n}} \gamma_m(t) \lambda_i^{(l)} \sum_{v(m)}^{-1} \cdot \left\{ \hat{o}_{r(m)}^{(s)}(t) - \sum_{\substack{j \neq i \\ c(m,i) \neq n}} \lambda_i^{(l)} \mu_{c(m,i)} \right\}.$$

It should be noted, that the ML estimate of $\mu_n$ also depends on $\mu_k$ where k does not equal n. The index n is used to represent leaf nodes of decisions trees of mean vectors, whereas the index k represents leaf modes of covariance decision trees. Therefore, it is necessary to perform the optimization by iterating over all $\mu_n$ until convergence.

This can be performed by optimizing all $\mu_n$ simultaneously by solving the following equations.

$$\begin{bmatrix} G_{11} & \cdots & G_{1N} \\ \vdots & \ddots & \vdots \\ G_{N1} & \cdots & G_{NN} \end{bmatrix} \begin{bmatrix} \hat{\mu}_1 \\ \vdots \\ \hat{\mu}_N \end{bmatrix} = \begin{bmatrix} k_1 \\ \vdots \\ k_N \end{bmatrix},$$ Eqn. 6

$$G_{n_1,n_2} = \sum_{\substack{m,t,x,l,i,j \\ c(m,i)=n_1 \\ c(m,j)=n_2}} \gamma_m(t) \lambda_i^{(l)} \sum_{v(m)}^{-1} \lambda_j^{(l)},$$ Eqn. 7

$$k_{n_1} = \sum_{\substack{m,t,s,l,i \\ c(m,i)=n_1}} \gamma_m(t) \lambda_i^{(l)} \sum_{v(m)}^{-1} \hat{\sigma}_{r(m)}^{(s)}(t).$$ Eqn. 8

However, if the training data is small or N is quite large, the coefficient matrix of equation 7 cannot have full rank. This problem can be avoided by using singular value decomposition or other well-known matrix factorization techniques.

The same process is then performed in order to perform an ML estimate of the covariances i.e. the auxiliary function shown in equation 4 is differentiated with respect to $\Sigma_k$ to give:

$$\hat{\Sigma}_k = \frac{\sum_{\substack{t,s,l,m \\ v(m)=k}} \gamma_m(t)(\hat{\sigma}_{r(m)}^{(s)}(t) - \mu_m^{(l)})(\hat{\sigma}_{r(m)}^{(s)}(t) - \mu_m^{(l)})^T}{\sum_{\substack{t,s,l,m \\ v(m)=k}} \gamma_m(t)}.$$ Eqn. 10

The ML estimate for language dependent weights and speaker dependent parameters can also be obtained in the same manner i.e. differentiating the auxiliary function with respect to the parameter for the which the ML estimate is required and then setting the value of the differenial to 0.

In a preferred embodiment, the process is performed in an iterative manner with, for example, an initial estimate of the language and speaker independent parameters, the speaker dependent parameters and the language dependent parameters.

Then, an ML estimate of one of whose parameters is performed using the initial estimates by differentiating the auxiliary function with respect to that parameter as explained above. Then, the language dependent parameters are estimated using the original language dependent parameters, the original language speaker and independent parameters and the updated speaker parameters.

Next, the language and speaker independent parameters are calculated using the ML formula using the original language and speaker independent parameters, and the recently calculated updated language dependent parameters and speaker dependent parameters. The process is repeated until convergence is achieved.

Figure 7:
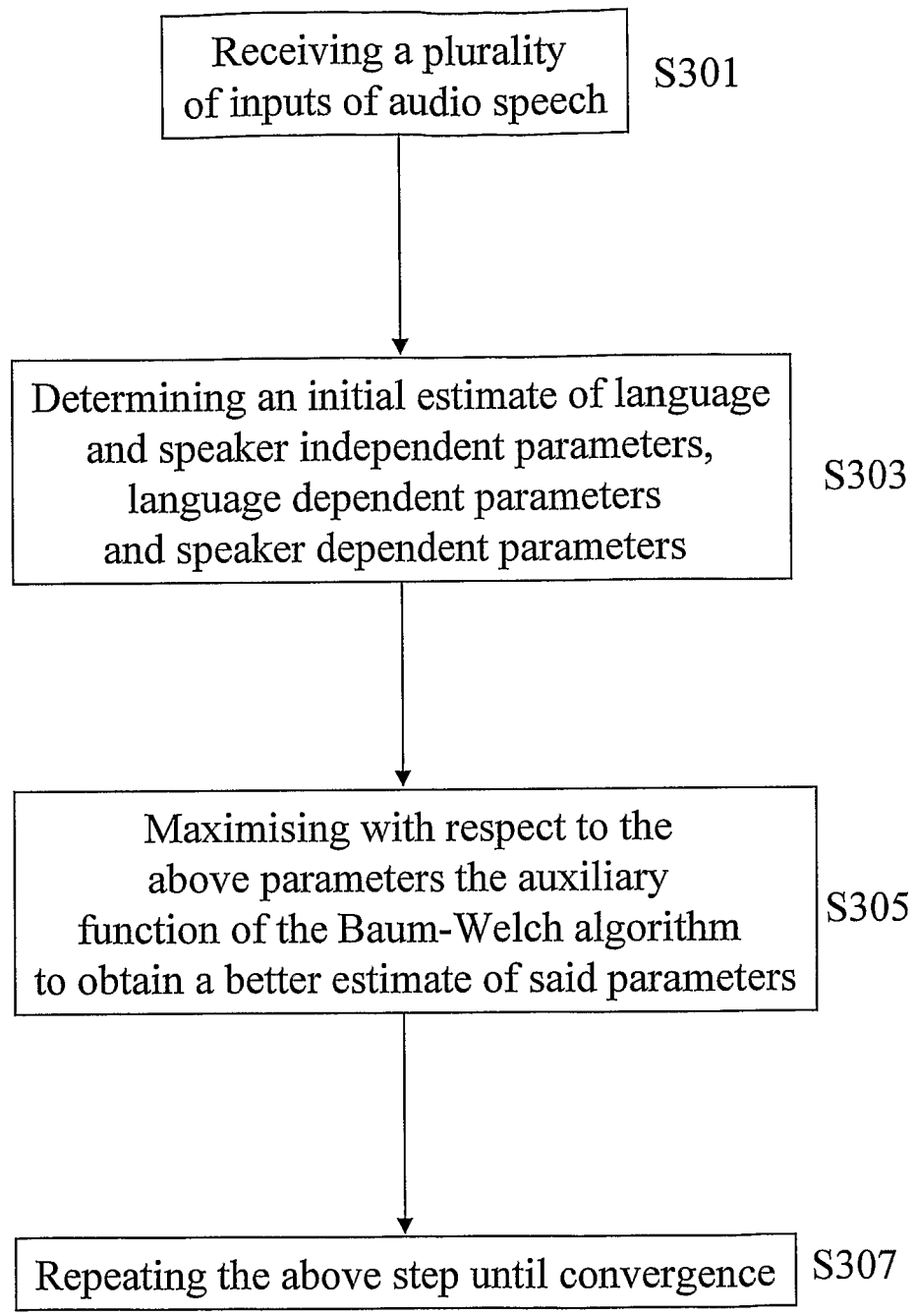
FIG. 7 is a flow diagram demonstrating a method of training a speech processing system in accordance with an embodiment of the present invention.

This basic system is explained with reference to the flow diagram of FIG. 7. In step S301, a plurality of inputs of audio speech are received. The plurality of inputs relate to different speakers speaking and different languages. Preferably, there are at least two speakers for each different language. Failure to provide this makes it difficult to separate language and speaker based features for a single language.

Next, in step S303, there is an initial estimate of language and speaker independent parameters, language dependent parameters and speaker dependent parameters. Possible initial estimates will be discussed later.

Next, as described above, the maximum likelihood calculations of the above parameters are performed by using the auxiliary function of the Baum-Welch algorithm to obtain a better estimate of said parameters. This is then repeated in step 307 until the parameters converge.

The above discussion as mentioned that the language independent means and variances are clustered. This clustering process will now be described.

In a preferred embodiment, the clusters of Gaussians are arranged such that each cluster is provided in the form of a decision tree. Further, each decision tree has its own parameter tying structure.

Due to computational constraints, it is difficult to build all trees at the same time. Therefore, the trees are constructed in an iterative approach. It is assumed that no means are shared across structures and each tree is iteratively reconstructed in turn.

Each binary decision tree is constructed in a locally optimal fashion starting with a single root node representing all contexts. In this embodiment, by context, the following bases are used, phonetic, linguistic and prosodic. As each node is created, the next optimal question about the context is selected. The question is selected on the basis of which question causes the maximum increase in likelihood and the terminal nodes generated in the training examples.

Then, the set of terminal nodes is searched to find the one which can be split using its optimum question to provide the largest increase in the total likelihood to the training data. Providing that this increase exceeds a threshold, the node is divided using the optimal question and two new terminal nodes are created. The process stops when no new terminal nodes can be formed since any further splitting will not exceed the threshold applied to the likelihood split.

Figure 8:
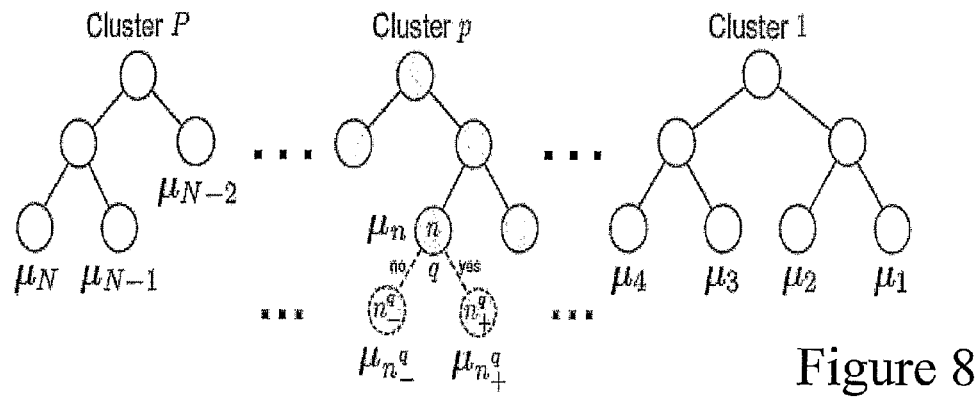
FIG. 8 is a schematic of decision trees used by the present invention.

This process is shown for example in FIG. 8. The nth terminal node in a mean decision tree is divided into two new terminal nodes $n_+^q$ and $n_-^q$ by a question q. To calculate the likelihood gain achieved by this split can be calculated as follows:

$$L = -\frac{1}{2} \mu_n^T \left\{ \sum_{\substack{m,t,s,l \\ c(m,p)=n}} \gamma_m(t) \lambda_p^{(l)} \sum_{v(m)}^{-1} \lambda_p^{(l)} \right\} \mu_n +$$

$$\mu_n^T \sum_{\substack{m,t,s,l \\ c(m,p)=n}} \gamma_m(t) \lambda_p^{(l)} \sum_{v(m)}^{-1} \cdot \left\{ \hat{\sigma}_{r(m)}^{(s)}(t) - \sum_{\substack{i \neq p \\ c(m,j) \neq n}} \lambda_j^{(l)} \mu_{c(m,i)} \right\} + C,$$ Eqn. 11

Where C is a constant term independent of $\mu_n$. The maximum likelihood of $\mu_n$ is given by equation 6. Thus, the above can be written as:

$$\mathcal{L} = \frac{1}{2} r_n^T R_n^{-1} r_n + C,$$ Eqn. 12

Where the following substitutions are made:

$$R_n = \sum_{\substack{m,t,s,l \\ c(m,p)=n}} \gamma_m(t) \lambda_p^{(l)} \sum_{v(m)}^{-1} \lambda_p^{(l)},$$ Eqn. 13

-continued $$r_n = \sum_{\substack{m,t,s,l \\ c(m,p)=n}} \gamma_m(t)\lambda_p^{(l)} \Sigma_{v(m)}^{-1} \hat{o}_{r(m)}^{(s)}(t) - $$

$$\sum_{\substack{m,t,s,l \\ c(m,p)=n}} \gamma_m(t)\lambda_p^{(l)} \Sigma_{v(m)}^{-1} \sum_{\substack{j \neq p \\ c(m,j) \neq n}} \lambda_j^{(l)} \mu_{c(m,i)}.$$

Eqn. 14

It is important to note that $r_n$ is not concerned with the regression class r of equation 4.

The log likelihood after splitting can therefore be expressed as follows:

$$L = \frac{1}{2}\left(r_{n_+^q}^T R_{n_+^q}^{-1} r_{n_+^q} + r_{n_-^q}^T R_{n_-^q}^{-1} r_{n_-^q}\right) + C.$$

Eqn. 15

Thus, the likelihood gained by splitting node n into $n_+^q$ and $n_-^q$ is given by:

$$\delta L(q) = \frac{1}{2}\left(r_{n_+^q}^T R_{n_+^q}^{-1} r_{n_+^q} + r_{n_-^q}^T R_{n_-^q}^{-1} r_{n_-^q} - r_n^T R_n^{-1} r_n\right).$$

Eqn. 16

Thus, using the above, it is possible to construct a decision tree for each cluster where the tree is arranged so that the optimal question is asked first in the tree and the decisions are arranged in hierarchical order according to the likelihood of splitting. A weighting is then applied to each cluster.

Decision trees are also constructed for variance. The covariance decision trees are constructed as follows: If the case terminal node in a covariance decision tree is divided into two new terminal nodes $k_+^q$ and $k_-^k$ by question q, the cluster covariance matrix and the gain by the split are expressed as follows:

$$\Sigma_k = \frac{\sum_{\substack{m,t,s,l \\ v(m)=k}} \gamma_m(t) \sum_{v(m)}}{\sum_{\substack{m,t,s,l \\ v(m)=k}} \gamma_m(t)},$$

Eqn. 17

$$L = -\frac{1}{2} \sum_{\substack{m,t,s,l \\ v(m)=k}} \gamma_m(t) \log|\Sigma_k| + D,$$

Eqn. 18

$$\delta L(q) = -\frac{1}{2}\left\{\sum_{k_+^q}\left|\sum_{\substack{m,t,s,l \\ v(m)=k_+^q}} \gamma_m(t) \log\left|\Sigma_{k_+^q}\right|\right| + \sum_{\substack{m,t,s,l \\ v(m)=k_-^q}} \gamma_m(t) \log\left|\Sigma_{k_-^q}\right|\right.$$

$$\left.\sum_{k^q}\left|-\sum_{\substack{m,t,s,l \\ v(m)=k}} \gamma_m(t) \log|\Sigma_k|\right|\right\}.$$

Eqn. 19 where D is constant independent of $\{\Sigma_k\}$.

As previously described, the parameters are estimated via an iterative process.

In the preferred embodiment, the parameters are initialized as follows:

The training data contains information which identifies the language and information which identifies the speaker. First, all the data from one language is considered and speaker variations between those language sets are estimated using a single transform per speaker.

As noted above, each model set has its own decision tree cluster tying structure. The speaker transforms are purely used to initialize the speaker dependent parameters. For initializing the language dependent parameters at the start, they are just set to either 1 or 0 dependent on the language identity i.e.:

$\lambda_i^{(l)}=1$—The model set for cluster i for language l
$\lambda_i^{(l)}=0$—otherwise To initialize $\{\mu_n\}_n$ and their decision trees are performed by using the language dependent model sets. To initialize $\{\Sigma_k\}_k$ and their decision trees, a set of language independent model sets are used in the preferred embodiment.

In this preferred embodiment, the same process is followed as described with reference to FIG. 7. However, once the parameters have been maximized as described above, the decision trees are reconstructed. Then the procedure starts again and the following process is followed.

1. Initialized language independent parameters i.e. in this preferred embodiment $\hat{M}_0=\{\mu_n,\Sigma_k\}_{i,k}$. Initialize speaker dependent parameters $\hat{W}_0=\{A_d^{(s)},b_d^{(s)}\}_{s,d}$ which in this example are speaker dependent constrained MLLR linear transforms and initialise language dependent parameter weights $\hat{\lambda}_0=\{\lambda_i^{(l)}\}_{i,l}$ are set j=0.
2. Estimate $\hat{W}_{j+1}$ given $\hat{M}_j$, $\hat{W}_j$ and $\hat{\lambda}_j$.
3. Estimate $\hat{\lambda}_{j+1}$ given $\hat{M}_j$, $\hat{W}_{j+1}$ and $\hat{\lambda}_j$.
4. Estimate $\hat{M}_{j+1}$ given $\hat{M}_j$, $\hat{W}_{j+1}$ and $\hat{\lambda}_{j+1}$.
5. j=j+1. Go to 2 until convergence
6. Re-construct mean and covariance decision trees.
7. Go to 2 until convergence The process is summarized in FIG. 9. FIG. 8 shows clusters 1 to P which are in the forms of decision trees. In this simplified example, there are just four terminal nodes in cluster 1 and three terminal nodes in cluster 2. It is important to note that the decision trees need not be symmetric i.e. each decision tree has exactly the same number of terminal nodes. The number of terminal nodes and the number of branches in the tree is determined purely by the log likelihood splitting which achieves the maximum split at the first decision and then the questions are asked in order of the question which causes the larger split. Once the split achieved is below a threshold, the splitting of a node terminates.

Figure 9:
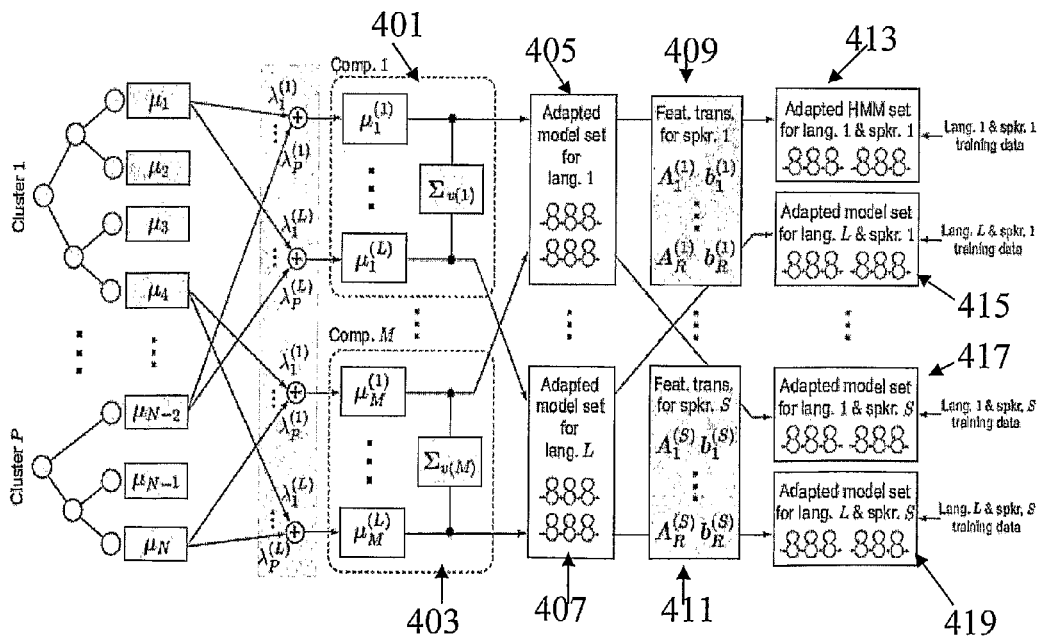
FIG. 9 is a schematic of a speech processing method being trained both language and speaker variations in accordance with an embodiment of the present invention.

Each tree has a tree weighting. The tree weightings in FIG. 9 are expressed as $\lambda_1 \ldots \lambda_P \ldots$. The mean for component 1 401 in language l=1 ($\lambda_1^{(l=1)}$) is expressed as $$\mu_1^{(l=1)}=\lambda_1^{(1)}\mu_1+\ldots+\lambda_P^{(1)}\mu_{N-2}$$

Similarly, for component 1 401 in language L, ($\mu_1^{(l=L)}$)

$$\mu_1^{(l=L)}=\lambda_1^{(L)}\mu_1+\ldots+\lambda_P^{(L)}\mu_{N-2}$$

these are both shown in box 401 of FIG. 8.

For component M 403, the same is achieved:

$$\mu_M^{(l=1)}=\lambda_1^{(1)}\mu_4+\ldots+\lambda_P^{(1)}\mu_N$$

and $$\mu_1^{(l=L)}=\lambda_1^{(L)}\mu_4+\ldots+\lambda_P^{(L)}\mu_N$$

In this embodiment, the variance stays constant for a particular component regardless of the language.

These parameters then provide an adapted model set for language L to be used in the text to speech system.

The adapted model set for a language/will comprise the variances for all of the components within language set/the variances are language independent. It will also comprise the language independent means which have been derived but which are weighted according to the specific language. The language sets are shown as 405 and 407.

When training, data will be received from multiple speakers. Therefore, it is necessary to have some means of removing or applying speaker effects. Generally, linear speaker transforms are provided 409, 411. This then results in combined language and speaker adapted HMM sets 413, 415, 417 and 419.

Figure 10:
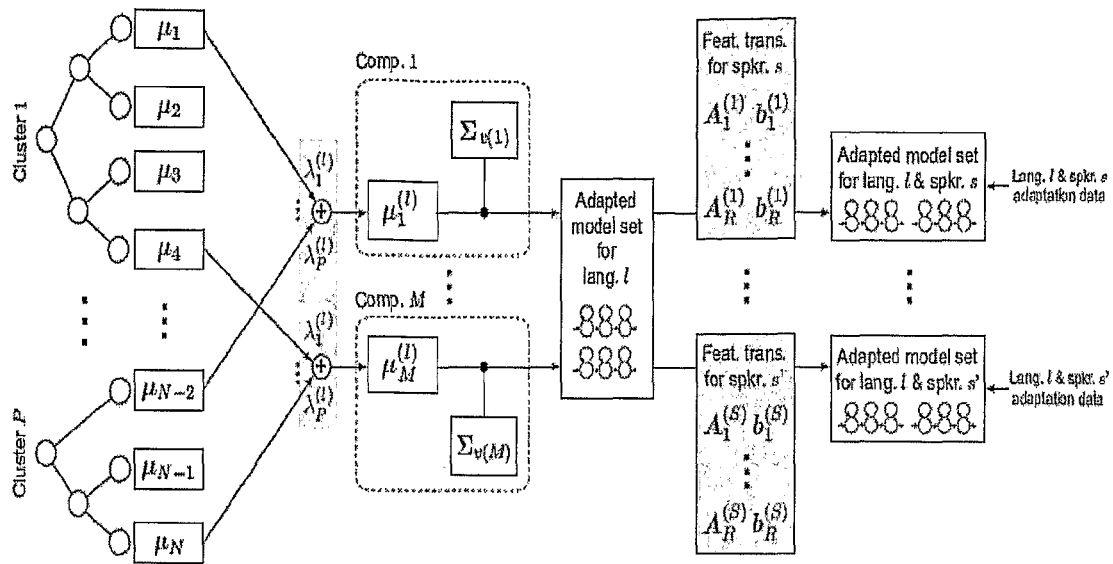
FIG. 10 is a schematic diagram showing the adapting of a system in accordance with an embodiment of the present invention to a new language.

The above describes a text to speech system and the training of a text to speech system. The next embodiments which will be described with reference to FIG. 10 is a text to speech system which can adapt easily to a new language without requiring extensive training data.

Although when adapting to a new language, the key is to obtain the language dependent parameters, it is also necessary to perform speaker analysis since data will be required from at least two speakers of the language.

Multiple speakers are required as it is not possible to separate language and speaker variations if there is only speech available from a single speaker.

The estimation process is similar to that described with reference to FIGS. 7 to 9. The process then proceeds as described with reference to FIG. 7 where the Baum-Welch auxiliary function is maximized for the langauge dependent weightings and the speaker parameters in an iterative manner. The shaded parts of FIG. 10 shows the parameters which are updated.

Figure 11:
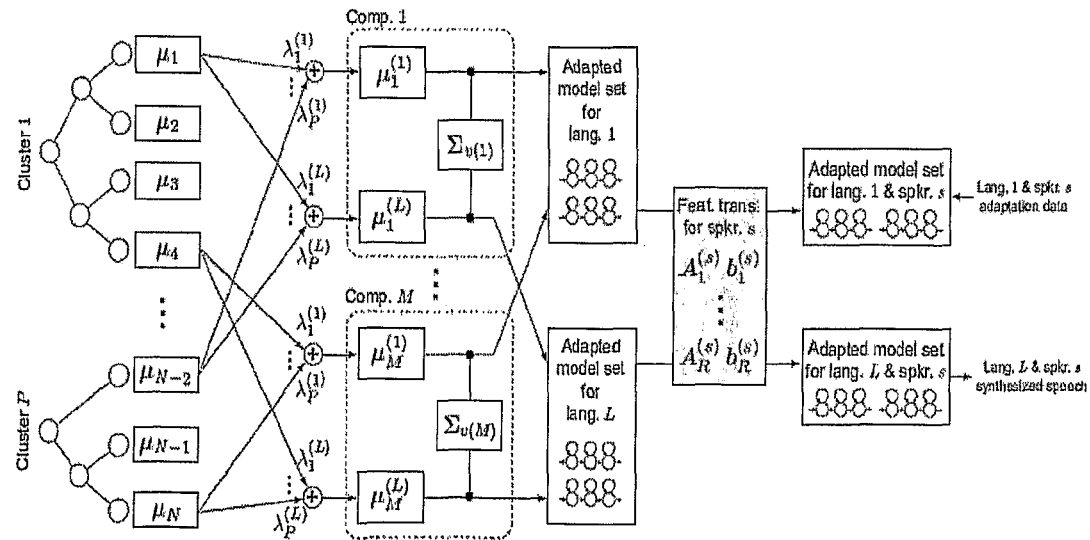
FIG. 11 is a schematic of a speech processing system in accordance with the method of the present invention adapting to a new speaker.

FIG. 11 shows the process for adapting to a new speaker. The target speaker will speak a language already included in the training data. Therefore, it is possible to construct a language dependent conical model using pre-estimated language dependent language weightings.

This then allows the speaker dependent transforms for the new speaker to be estimated as is shown with reference to FIG. 11.

Once the speaker transforms have been estimated for the known language of the speaker, the speakers voice can then be output and be used for outputting any language covered by the system.

The invention claimed is:

1. A text-to-speech method for use in a plurality of languages,
said method comprising:
inputting text in a selected language;
dividing said inputted text into a sequence of acoustic units;
converting said sequence of acoustic units to a sequence of speech vectors using an acoustic model, wherein said model has a plurality of model parameters describing probability distributions which relate an acoustic unit to a speech vector; and
outputting said sequence of speech vectors as audio in said selected language,
wherein a parameter of a predetermined type of each probability distribution in said selected language is expressed as a weighted sum of language independent parameters of the same type, and wherein the weighting used is language dependent, such that converting said sequence of acoustic units to a sequence of speech vectors comprises retrieving the language dependent weights for said selected language.

2. A text-to speech method according to claim 1, wherein the parameter of a predetermined type is a mean.

3. A text-to-speech system according to claim 1, wherein the probability distributions are selected from a Gaussian distribution, Poisson distribution, Gamma distribution, Student-t distribution or Laplacian distribution.

4. A text-to-speech method according to claim 1, further comprising:
selecting a voice for the audio output, obtaining transform parameters for said voice and transforming the speech vectors and/or model parameters for the selected language to the selected voice using said transform parameters.

5. A text-to-speech method according to claim 1, wherein said acoustic units are phonemes, graphemes, context dependent phonemes or graphemes, diphones, triphones or syllables.

6. A text-to-speech method according to claim 1, wherein said acoustic model is a hidden Markov model or a hidden semi-Markov model.

7. A method of training a text to speech system, said text-to-speech system comprising an acoustic model used to convert a sequence of acoustic units to a sequence of speech vectors, said model having a plurality of model parameters comprising language and speaker independent parameters, language dependent parameters and speaker dependent parameters describing probability distributions relating acoustic units to speech vectors, the method comprising:
expressing the auxiliary function of an Expectation Maximisation algorithm in terms of language and speaker independent parameters, language dependent parameters and speaker dependent parameters, said auxiliary function involving summations of data from different languages and different speakers;
receiving a plurality of inputs of audio speech each of which correspond to known text from a speaker in a known language, wherein at least two inputs have different languages;
deriving an initial estimate of the language and speaker independent parameters, the language dependent parameters and the speaker dependent parameters;
maximising said auxiliary function with respect to language and speaker independent parameters, language dependent parameters and speaker dependent parameters to obtain a better estimate of said language and speaker independent parameters, the language dependent parameters and the speaker dependent parameters;
repeating said maximisation step until said language and speaker independent parameters, the language dependent parameters and the speaker dependent parameters converge, wherein a predetermined type of parameter in each probability distribution for a language is expressed as a weighted sum of language independent parameters of the same type and said language dependent parameters are said weightings which are language dependent.

8. A method according to claim 7, wherein said predetermined type of parameter is the mean of a probability distribution.

9. A method according to claim 8, wherein said means are clustered and a language dependent weighting is applied for each cluster for each language.

10. A method according to claim 9, wherein each cluster is a decision tree, the decisions represented by said trees being related to linguistic, phonetic or prosodic variations.

11. A method according to claim 10, wherein constructing the decision tree is performed after cycle of maximising the auxiliary function with respect to said language and speaker independent parameters, language dependent parameters and speaker dependent parameters.

12. A method according to claim 7, wherein said speaker dependent parameters comprise transform parameters applied to a speech vector and/or speaker independent model parameters.

13. A non-transitory carrier medium carrying computer readable instructions for controlling the computer to carry out the method of claim 7.

14. A method of training a text to speech system, said text-to-speech system comprising an acoustic model used to convert a sequence of acoustic units to a sequence of speech vectors, said model having a plurality of model parameters comprising language and speaker independent parameters, language dependent parameters and speaker dependent parameters describing probability distributions relating acoustic units to speech vectors, the method comprising:
- expressing the auxiliary function of an Expectation Maximisation algorithm in terms of language and speaker independent parameters, language dependent parameters and speaker dependent parameters, said auxiliary function involving summations of data from different languages and different speakers;
- receiving a plurality of inputs of audio speech each of which correspond to known text from a speaker in a known language, wherein at least two inputs have different languages;
- deriving an initial estimate of the language and speaker independent parameters, the language dependent parameters and the speaker dependent parameters;
- maximising said auxiliary function with respect to language and speaker independent parameters, language dependent parameters and speaker dependent parameters to obtain a better estimate of said language and speaker independent parameters, the language dependent parameters and the speaker dependent parameters;
- repeating said maximisation step until said language and speaker independent parameters, the language dependent parameters and the speaker dependent parameters converge, wherein said speaker and language independent parameters comprise variances of said probability distributions, wherein said variances are clustered and a decision tree is formed for each cluster.

15. A method of adapting a polyglot text-to-speech system to operate in a new language,
said polyglot text-to-speech system comprising:
- an acoustic model used to convert a sequence of acoustic units to a sequence of speech vectors, said model having a plurality of model parameters comprising language and speaker independent parameters describing probability distributions relating acoustic units to a speech vectors, language dependent parameters and speaker independent parameters and speaker dependent parameters, wherein a predetermined type of parameter in each probability distribution for a language is expressed as a weighted sum of language independent parameters of the same type and said language dependent parameters are said weightings which are language dependent, said method comprising:
- expressing the auxiliary function of an Expectation Maximisation algorithm in terms of language and speaker independent parameters, language dependent parameters and speaker dependent parameters, said auxiliary function involving summations of data from different languages and different speakers;
- receiving a plurality of inputs of audio speech each of which correspond to known text from at least two speakers in said new language;
- obtaining an initial estimate of the speaker dependent parameters use for the speakers of the new language;
- obtaining an initial estimate of the language dependent parameters for said new language;
- maximising said auxiliary function with respect to language dependent parameters and speaker dependent parameters to obtain a better estimate of said language dependent parameters and speaker dependent parameters for all speakers and languages;
- repeating said maximisation step until said language dependent parameters and the speaker dependent parameters converge.

16. A text-to-speech processing system for use in a plurality of languages,
said system comprising:
a text input configured to accept inputted text;
a processor configured to:
- divide said inputted text into a sequence of acoustic units;
- convert said sequence of acoustic units to a sequence of speech vectors using an acoustic model, wherein said model has a plurality of model parameters describing probability distributions which relate an acoustic unit to a speech vector; and
- output said sequence of speech vectors as audio in said selected language,
wherein a parameter of a predetermined type of each probability distribution in said selected language is expressed as a weighted sum of language independent parameters of the same type, and wherein the weighting used is language dependent, such that converting said sequence of acoustic units to a sequence of speech vectors comprises retrieving the language dependent weights for said selected language.

17. A trainable text-to-speech system, the system comprising a processor configured to run an acoustic model which converts a sequence of acoustic units to a sequence of speech vectors, said model having a plurality of model parameters comprising language and speaker independent parameters, language dependent parameters and speaker dependent parameters describing probability distributions relating acoustic units to speech vectors, wherein a predetermined type of parameter in each probability distribution for a language is expressed as a weighted sum of language independent parameters of the same type and said language dependent parameters are said weightings which are language dependent,
the processor being configured to:
- express the auxiliary function of an Expectation Maximisation algorithm in terms of language and speaker independent parameters, language dependent parameters and speaker dependent parameters, said auxiliary function involving summations of data from different languages and different speakers;
- receive a plurality of inputs of audio speech each of which correspond to known text from a speaker in a known language, wherein at least two inputs have different languages;
- derive an initial estimate of the language and speaker independent parameters, the language dependent parameters and the speaker dependent parameters;
- maximise said auxiliary function with respect to language and speaker independent parameters, language dependent parameters and speaker dependent parameters to obtain a better estimate of said language and speaker independent parameters, the language dependent parameters and the speaker dependent parameters; and
- repeat said maximisation until said language and speaker independent parameters, the language dependent parameters and the speaker dependent parameters converge.

18. A polyglot text-to-speech system which is adaptable to a new language, said polyglot text-to-speech system comprising a processor configured to run an acoustic model used to convert a sequence of acoustic units to a sequence of speech vectors, said model having a plurality of model parameters comprising language and speaker independent parameters describing probability distributions relating acoustic units to a speech vectors, language dependent parameters and speaker independent parameters and speaker dependent parameters, wherein a predetermined type of parameter in each probability distribution for a language is expressed as a weighted sum of language independent parameters of the same type and said language dependent parameters are said weightings which are language dependent, said processor being further configured to:

express the auxiliary function of an Expectation Maximisation algorithm in terms of language and speaker independent parameters, language dependent parameters and speaker dependent parameters, said auxiliary function involving summations of data from different languages and different speakers;

receive a plurality of inputs of audio speech each of which correspond to known text from at least two speakers in said new language;

obtain an initial estimate of the speaker dependent parameters use for the speakers of the new language;

obtain an initial estimate of the language dependent parameters for said new language;

maximise said auxiliary function with respect to language dependent parameters and speaker dependent parameters to obtain a better estimate of said language dependent parameters and speaker dependent parameters for all speakers and languages; and repeat said maximisation step until said language dependent parameters and the speaker dependent parameters converge.

* * * * *